(12) United States Patent
Sanchez et al.

(10) Patent No.: US 10,813,724 B2
(45) Date of Patent: Oct. 27, 2020

(54) DENTAL IMPLANT WITH IMPROVED PROSTHETIC INTERFACE

(71) Applicant: Zimmer Dental, Inc., Carlsbad, CA (US)

(72) Inventors: Ramiro Sanchez, Temecula, CA (US); Jeffrey Bassett, Vista, CA (US)

(73) Assignee: Zimmer Dental, Inc., Carlsbad, CA (US)

( * ) Notice: Subject to any disclaimer, the term of this patent is extended or adjusted under 35 U.S.C. 154(b) by 286 days.

(21) Appl. No.: 14/205,761

(22) Filed: Mar. 12, 2014

(65) Prior Publication Data

US 2014/0272791 A1 Sep. 18, 2014

Related U.S. Application Data

(60) Provisional application No. 61/801,137, filed on Mar. 15, 2013.

(51) Int. Cl.
*A61C 8/00* (2006.01)

(52) U.S. Cl.
CPC ............ *A61C 8/0075* (2013.01); *A61C 8/006* (2013.01); *A61C 8/0012* (2013.01);
(Continued)

(58) Field of Classification Search
CPC ... A61C 8/0075; A61C 8/0012; A61C 8/0013; A61C 8/0022; A61C 8/0025;
(Continued)

(56) References Cited

U.S. PATENT DOCUMENTS 4,636,216 A * 1/1987 Tatum .................... A61C 8/00
433/173
5,527,182 A 6/1996 Willoughby
(Continued)

FOREIGN PATENT DOCUMENTS

CN 101188982 A 5/2008
CN 101730511 A 6/2010
(Continued)

OTHER PUBLICATIONS

"Application Serial No. PCT/US2014/024046, International Preliminary Report on Patentability dated Sep. 24, 2015", 8 pgs.
(Continued)

*Primary Examiner* — Cris L. Rodriguez
*Assistant Examiner* — Mirayda A Aponte
(74) *Attorney, Agent, or Firm* — Schwegman Lundberg & Woessner, P.A.

(57) ABSTRACT

Dental implants, dental abutments, and dental systems are disclosed. A dental implant can include an implant body having a longitudinal axis, a coronal end, and an apical end. An internal bore can be provided within the implant body, and can have a coronal end, adjacent to the coronal end of the implant body, and an apical end. The internal bore can include a first internally facing surface, extending from the coronal end of the internal bore towards the apical end of the internal bore, at least a portion of which tapers inwardly towards the apical end of the internal bore. The internal bore can further include an internally threaded portion positioned between an apical end of the first internally facing surface and the apical end of the internal bore. A dental abutment can be configured to engage with the dental implant.

25 Claims, 12 Drawing Sheets

(52) U.S. Cl.
CPC .......... *A61C 8/0013* (2013.01); *A61C 8/0022* (2013.01); *A61C 8/0025* (2013.01); *A61C 8/0054* (2013.01); *A61C 8/0066* (2013.01); *A61C 8/0068* (2013.01); *A61C 8/0069* (2013.01); *A61C 8/0071* (2013.01); *A61C 8/0074* (2013.01)

(58) Field of Classification Search
CPC ..... A61C 8/0054; A61C 8/006; A61C 8/0066; A61C 8/0068; A61C 8/0069; A61C 8/0071; A61C 8/0074; A61C 13/0022; A61C 8/0018; A61C 8/005; F16B 37/125
USPC .................................................. 433/172–176
See application file for complete search history.

(56) References Cited

U.S. PATENT DOCUMENTS

| | | | |
|---|---|---|---|
| 5,947,733 A | 9/1999 | Sutter et al. | |
| 6,168,436 B1* | 1/2001 | O'Brien | A61C 8/005 433/172 |
| 6,431,866 B2 | 8/2002 | Hurson et al. | |
| 6,726,481 B1* | 4/2004 | Zickmann | A61C 8/005 433/173 |
| 7,249,949 B2 | 7/2007 | Carter | |
| 7,699,613 B2 | 4/2010 | Niznick | |
| 8,038,442 B2* | 10/2011 | Hurson | A61C 8/0022 433/173 |
| 8,202,088 B2* | 6/2012 | Mehrhof | A61C 8/00 433/173 |
| 2005/0287497 A1* | 12/2005 | Carter | A61C 8/005 433/173 |
| 2007/0037123 A1 | 2/2007 | Mansueto et al. | |
| 2007/0059666 A1 | 3/2007 | Zickman | |
| 2007/0072150 A1 | 3/2007 | Mansueto et al. | |
| 2008/0233539 A1* | 9/2008 | Rossler | A61C 8/0001 433/174 |
| 2009/0111072 A1* | 4/2009 | Lombardo | A61C 8/005 433/174 |
| 2009/0298015 A1 | 12/2009 | Al-Attar | |
| 2010/0015571 A1 | 1/2010 | Al-Attar | |
| 2010/0119995 A1 | 5/2010 | Grant | |
| 2011/0029093 A1* | 2/2011 | Bojarski | A61F 2/389 623/20.35 |
| 2011/0244424 A1 | 10/2011 | Mehrhof | |
| 2012/0021381 A1 | 1/2012 | Hurson | |
| 2012/0077151 A1 | 3/2012 | Nary Filho et al. | |
| 2012/0178048 A1 | 7/2012 | Cottrell | |
| 2012/0295223 A1 | 11/2012 | Robb et al. | |
| 2013/0017513 A1* | 1/2013 | Lutz | A61C 8/005 433/174 |

FOREIGN PATENT DOCUMENTS

| | | |
|---|---|---|
| CN | 101909542 A | 12/2010 |
| CN | 105208965 A | 12/2015 |
| DE | 102008033367 A1 | 1/2010 |
| EP | 1728486 A1 | 12/2006 |
| KR | 101240116 B1 | 3/2013 |
| WO | WO-9714371 A1 | 4/1997 |
| WO | WO 2007031562 A2 * | 3/2007 ............... A61C 8/00 |
| WO | WO-2011034781 A2 | 3/2011 |
| WO | WO-2014150713 A1 | 9/2014 |

OTHER PUBLICATIONS

"International Application Serial No. PCT/US2014/024046, International Search Report dated May 28, 2014", 4 pgs.

"International Application Serial No. PCT/US2014/024046, Written Opinion dated May 28, 2014", 6 pgs.

"European Application Serial No. 14714892.8, Response filed May 16, 2016 to Communication pursuant to Rules 161(1) and 162 EPC dated Nov. 6, 2015", 10 pgs.

"Internal Hex with Friction-Fit", Zimmer dental, Rev. 01/05, (2005), 6 pgs.

"Chinese Application Serial No. 201480027076.1, Office Action dated Jun. 14, 2017", w/ English Translation, 14 pgs.

"Chinese Application Serial No. 201480027076.1, Office Action dated Feb. 26, 2018", 6 pgs.

"Chinese Application Serial No. 201480027076.1, Response filed Oct. 25, 2017 to Office Action dated Jun. 14, 2017", w. English Translation, 15 pgs.

"Australian Application Serial No. 2014235703, Response Filed Feb. 28, 2019 to Subsequent Examiners Report dated Dec. 4, 2018", 13 pgs.

"Australian Application Serial No. 2014235703, Subsequent Examiners Report dated Dec. 4, 2018", 5 pgs.

"European Application Serial No. 14714892.8, Communication Pursuant to Article 94(3) EPC dated Apr. 5, 2019", 4 pgs.

"European Application Serial No. 14714892.8, Response Filed Jan. 2, 2019 to Communication Pursuant to Article 94(3) EPC dated Aug. 14, 2018", 15 pgs.

"Australian Application Serial No. 2014235703, First Examination Report dated Jul. 27, 2018", 5 pgs.

"Chinese Application Serial No. 201480027076.1, Response filed Apr. 9, 2018 to Office Action dated Feb. 26, 2018", (W/ English Claims), 13 pgs.

"European Application Serial No. 14714892.8, Communication Pursuant to Article 94(3) EPC dated Aug. 14, 2018", 5 pgs.

"European Application Serial No. 14714892.8, Response filed Aug. 15, 2019 to Communication Pursuant to Article 94(3) EPC dated Apr. 5, 2019", 20 pgs.

"Australian Application Serial No. 2019203708, First Examination Report dated Feb. 10, 2020", 4 pgs.

"Australian Application Serial No. 2019203708, Response filed May 18, 2020 to First Examination Report dated Feb. 10, 2020", 19 pgs.

"Canadian Application Serial No. 2,905,383, Office Action dated May 3, 2019", 4 pgs.

* cited by examiner

DENTAL IMPLANT WITH IMPROVED PROSTHETIC INTERFACE

CLAIM OF PRIORITY

This application claims the benefit of U.S. Provisional Patent Application Ser. No. 61/801,137, filed on Mar. 15, 2013, the benefit of priority of which is claimed hereby, and which is incorporated by reference herein in its entirety.

TECHNICAL FIELD

The present patent document pertains generally to the field of dental implants and abutments. The invention disclosed herein can also be applied to other orthopedic applications such as spinal pedicel screws, bone screws used in trauma applications or other bone screws consisting of a three piece assembly (bone screw, adapting head, fastening screw). More particularly, but not by way of limitation, the patent document pertains to an interface between a dental implant and a dental abutment.

BACKGROUND

A dental implant can be used in an oral treatment procedure to restore appearance or function of a removed tooth. A dental implant can mimic a root of a natural tooth that is replaced. A surgeon can replace the natural tooth with a prosthetic tooth that is mounted on a coronal portion of an abutment, which in turn, is attached to the dental implant on an apical portion. During surgery, the surgeon can insert the dental implant into a dental bone cavity. A successful dental implant procedure generally requires more than bone affixation or osseointegration. Implant success can also require maintenance of the cortical bone at the coronal crest of the implant and maintenance of soft tissue structures in the implant region. The health of tissues in this region contributes to the aesthetic appearance of a full restoration. Maintenance of healthy tissue in the implant region can also lead to the creation of a tissue seal that hinders the propagation of infection along the implant body.

In both natural teeth and dental implants, ectodermal tissue serves to protect against intrusion of bacteria and other foreign materials. An ectodermal tissue seal that protects the alveolar bone is known as the biologic width. The biologic width is a tissue ring and its position is dependent on the geometry and surgical placement of the dental implant. On a two-piece dental prosthesis, a micro-gap generally exists between the implant and the abutment. There is evidence to suggest that the position of the micro-gap has an effect on the position of the biologic width, and therefore on the height of the crestal alveolar bone.

Additional evidence suggests the both vertical and horizontal offset of the micro-gap can contribute to crestal bone height. By offsetting the micro-gap away from the outer edges of the implant, crestal bone height can be maintained. However, such offsetting can result in a smaller abutment/implant interface and may compromise the mechanical strength of the restoration. To accomplish such an offset connection, manufacturers have introduced a conical connection between the abutment and the implant.

A conical connection might use interfacing shallow angle tapers on the abutment and the implant to shift the micro-gap. This connection can create a sealed interface that discourages penetration of bacteria or other foreign substances into a screw thread and other internal features of an implant body. The conical connection, when used alone, can create a spreading force that tends to crack and split the implant.

OVERVIEW

The present patent document describes examples that can include any one or combinations of an implant, an abutment, and an implant system. One or more of the described examples can offer the benefit of an offset micro-gap that can maintain the mechanical strength of a device. The examples can include one or more of several features, including but not limited to: 1) a sealing feature, 2) an interference fit feature, and 3) a stability feature. Some of the features can work together and overlap in design and structure, and all of the features can optionally be present in each example. Furthermore, each of the features can serve one or more functions. For example, an interference fit feature can also provide a sealing function. The present patent document contemplates using one or more of three design components including: 1) a shoulder and matching engagement surface (shoulder connection); 2) a mating conical taper (conical connection); and 3) a mating anti-rotational means (anti-rotational means connection).

These three design components can be combined and configured such that at least two of the components are present in each abutment and/or implant of an implant system. An implant system can include an abutment that matches an implant. For example, if the abutment is configured with a shoulder and a conical taper, the implant can be configured with a surface that the shoulder engages and a mating conical taper. If the abutment is configured with a conical taper and an anti-rotational means, the implant can be configured with a conical taper and an anti-rotational means. One example can include all three components in both the implant and the abutment. The components can be combined in ways that can involve changing their function. In an example, the shoulder might provide a large percentage of the stability and a small percentage of the sealing. In another example the shoulder can provide a large percentage of the sealing. In various other examples, the conical tapers can have an interference fit, the anti-rotational means can have an interference fit, and/or both the conical tapers and the anti-rotational means can have an interference fit.

An interference fit between the abutment and the implant can provide sealing either between mating conical tapers or between mating anti-rotational means portions. Mating conical tapers can be referenced as a conical connection. A mating anti-rotational means connection can be referenced as an anti-rotational means connection. A connection between a shoulder on an abutment and a shoulder engaging surface on an implant can be referenced as a shoulder connection. An interference fit can be provided in either a conical connection or an anti-rotational means connection between the implant and abutment. An interference fit can be provided in both a conical connection and an anti-rotational means connection between the implant and abutment. When both a conical connection and an anti-rotational connection are present and both connections have an interference fit, the implant system can have a greater stability in terms of resistance to tipping and resistance to screw loosening, than an implant with a conical connection alone.

If the conical connection or the anti-rotational means connection is used alone with a shoulder connection, then an interference fit is required in the conical connection or the anti-rotational means connection. If both the conical connection and the anti-rotational means connection are used together, with the shoulder connection—then an interference fit is only required in one component. When a shoulder connection is used, a shoulder of an abutment can engage a coronal surface of the implant and provide stability. A shoulder connection can also provide an upper limit to any downward movement of the abutment as it is tightened into the implant. In an example when the shoulder is not used, both the conical connection and the anti-rotational means connection can have an interference fit. In an example with both the anti-rotational means connection and conical connection can have an interference fit; additional stability can be provided as well as an additional positioning limit because the two components are both entering into an interference fit simultaneously.

One existing problem is that without some limit to prevent an abutment from moving too far apically as it is being tightened; there can be the possibility of cracking the implant if there is any taper feature, such as a conical connection. This problem can be overcome in at least two ways: 1) by having an abutment shoulder engaging the implant or 2) by having more than one component with an interference fit that limits apical movement of the abutment as it is tightened.

Vertical forces, such as bite forces, can be transferred from an abutment to an implant directly though a connection between an abutment and an implant. Such a connection may have connecting surfaces on the abutment and the implant that are substantially perpendicular to the longitudinal axes of the implant and abutment. Bending loads may also be transferred at least in part by bearing along part of the connection. A dental implant is typically a cylinder with the longest dimension oriented parallel to the vertical component of a biting force. Through a connection with a shoulder, compressive loads are transmitted vertically in a direction of the greatest material thickness of the implant.

An exemplary connection can be a combination of a shoulder connection and an interference fit between some portion of the implant and the abutment. The shoulder connection can offer mechanical strength and a definitive stop, while an interference fit between the abutment and the implant can limit rotation and create a seal with the above mentioned micro-gap offsetting advantages.

In an example, the interface between an abutment and an implant can include a first element at the apical end of the abutment such as a hexagonal polygon. This polygon can create an anti-rotational interface with a similarly shaped socket in an implant. The polygon can be a friction fit like Zimmer Dental's TSV Hex-Lock® connection. The polygon interface can also provide a way to index prosthetics. An orientation selected to build the prosthetic in a dental laboratory can be relocated when the prosthetic is placed in the patient.

A second element of the combined connection between the implant and abutment can be located adjacent and coronal to the polygon, such as a conical taper. This element can feature a gradual taper that decreases in diameter in the apical direction. The angle of the taper can be in a range between about 1° and about 18°. This selection can assure that a tapered element of the abutment extends deep into a mating receptacle on the implant. The implant receptacle can also be conical and very close in angulations to the abutment cone. In this manner the two cones can have a longer area of engagement or interference where sealing can occur.

Benefits of a long engagement of the tapered seal can include, for example: 1) stability between the implant and abutment; and 2) a seal that can prevent the exchange of fluids that may contain bacteria and other pathogens between the inside chamber of the implant and the outside environment. A phenomenon known as micro-pumping can transfer bacteria that have incubated inside of the implant onto soft and hard tissue adjacent to the implant. Micro-pumping can have a detrimental effect on tissue in an implant region and on the success of the implant restoration.

A shoulder connection can have a shoulder that is oriented substantially perpendicular to the long access of the implant body and can create a substantially flat connection between the implant and the abutment. This flat connection can utilize the increased material thickness of the long axis to resist tipping forces.

Another stable connection can be configured by having both a conical connection and an anti-rotational connection that are both tapered and have interference fits. This type of connection can be much more stable than a connection with only a conical connection. In a connection with only a conical connection, under sufficient loading, mating cones can act like a ball and socket joint and can be ineffective in preventing tipping (rotation perpendicular to the long axis) of an abutment.

A flat shoulder connection between the implant and the abutment can also create a definite stop that can limit a cone to cone interference connection and therefore limit an outward force and hoop stress created by the cone to cone interference connection. In another example there can be an interference fit between the anti-rotational means, and providing the shoulder connection can allow for more precise control of the interference fit at this connection. For example, in a hexagonal polygon anti-rotational element, the hex can be seated to virtually eliminate rotational micro-movement without becoming over stressed.

A retaining fastener can connect an implant and an abutment. A high degree of retaining fastener pre-load can be assured by the combination connection of a conical connection and a shoulder connection. When the shoulder connection seats, for example if a shoulder on the abutment contacts a mating surface of the implant, the vertical motion of the abutment can be prevented. At this point a full torque applied to the fastener can act to stretch the fastener shaft. This stretching of the fastener shaft can store energy, which can maintain a clamping force that prevents the fastener from loosening.

It can be important to set taper diameters and angles of the implant and abutment correctly to provide a sufficient seal between tapers and engage mating anti-rotational elements just prior to seating the shoulder connection. Seating the shoulder connection sets a precise and known height of abutment features for an implant interface. Additional fastener tightening to a predetermined torque value can establish a precise fastener preload. When a shoulder connection is used, the taper in either or both of the conical connection or the anti-rotational means connection can be designed so that as the interference fit acquires the proper pre-load, the shoulder connection simultaneously forms a tight seal.

A precise and known abutment seating height can be important clinically. Typically, the tooth prosthetic is made in a dental laboratory on an implant analog in a dental model and then transferred to a patient. Differences in a vertical seating height between the abutment in the analog and the abutment in the implant can result in aesthetic or even functional problems with the restoration.

The advantages of the described combination connection can be numerous but creating such a connection may require precise selection of the dimensions and tolerances of one or more of the three components (i.e., the conical connection, the anti-rotational means connection and the shoulder connection). Other examples of the present patent document where the implant recess and abutment mating features are reversed or where the anti-rotational interface is of another geometry or excluded entirely are possible and are contemplated by this specification.

This Overview is intended to provide an overview of subject matter of the present patent document. It is not intended to provide an exclusive or exhaustive explanation of the invention. The detailed description is included to provide further information about the present patent document.

To further describe the dental implant devices, abutments, and systems disclosed herein, a non-limiting list of examples is provided here:

In Example 1, a dental implant can comprise an implant body having a longitudinal axis, a coronal end, and an apical end. The coronal end of the implant body can include an externally facing surface oriented substantially transverse to the longitudinal axis and structured to engage an external shoulder portion of an abutment. The dental implant can also include an internal bore, provided within the implant body, having a coronal end adjacent to the coronal end of the implant body and an apical end, the internal bore including a first internally facing surface, extending from the coronal end of the internal bore towards the apical end of the internal bore, at least a portion of which tapers inwardly towards the apical end of the internal bore. The internal bore can further include an internally threaded portion positioned between an apical end of the first internally facing surface and the apical end of the internal bore.

In Example 2, the dental implant of Example 1 can optionally be configured such that the first internally facing surface is configured to form an interference fit with an abutment.

In Example 3, the dental implant of any one or any combination of Examples 1 or 2 can optionally be configured such that the first internally facing surface includes an anti-rotation feature.

In Example 4, the dental implant of Example 3 can optionally be configured such that the anti-rotation feature includes a polygon-shaped internal perimeter.

In Example 5, the dental implant of any one or any combination of Examples 1-4 can optionally be configured to further comprise an anti-rotation feature disposed within the internal bore, between the apical end of the first internally facing surface and a coronal end of the internally threaded portion.

In Example 6, the dental implant of Example 5 can optionally be configured such that the anti-rotation feature includes a polygon-shaped internal perimeter.

In Example 7, the dental implant of Example 6 can optionally be configured such that the anti-rotation feature defines a second internally facing surface of the internal bore, at least a portion of the second internally facing surface being tapered inwardly towards the apical end of the internal bore.

In Example 8, a dental abutment can comprise an abutment body having a longitudinal axis, a coronal end, and an apical end, wherein the abutment body includes a first externally facing surface, extending from a location between the coronal end and the apical end and towards the apical end, at least a portion of which tapers inwardly towards the apical end. The dental abutment can also include an internal bore provided within the abutment body, at least a portion of the internal bore having internal threads, and an external shoulder positioned between a coronal end of the first externally facing surface and the coronal end of the abutment body.

In Example 9, the dental abutment of Example 8 can optionally be configured such that the first externally facing surface is configured to form an interference fit with a dental implant.

In Example 10, the dental abutment of any one or any combination of Examples 8 or 9 can optionally be configured such that the first externally facing surface includes an anti-rotation feature.

In Example 11, the dental abutment of Example 10 can optionally be configured such that the anti-rotation feature includes a polygon-shaped external perimeter.

In Example 12, the dental abutment of any one or any combination of Examples 8-11 can optionally be configured to further comprise an anti-rotation feature positioned between an apical end of the first externally facing surface and the apical end of the abutment body.

In Example 13, the dental abutment of Example 12 can optionally be configured such that the anti-rotation feature includes a polygon-shaped external perimeter.

In Example 14, the dental abutment of any one or any combination of Examples 12 or 13 can optionally be configured such that the anti-rotation feature defines a second externally facing surface of the abutment body, at least a portion of the second externally facing surface tapered inwardly towards the apical end of the abutment body.

In Example 15, a dental implant system can comprise an implant comprising: an implant body having a longitudinal axis, a coronal end, and an apical end; an implant internal bore, provided within the implant body, having a coronal end adjacent to the coronal end of the implant body and an apical end; a first internally facing surface extending from the coronal end of the implant internal bore towards the apical end of the implant internal bore, at least a portion of the first internally facing surface being tapered inwardly towards the apical end of the implant internal bore; and an internally threaded portion positioned within the implant internal bore between an apical end of the first internally facing surface and the apical end of the implant internal bore. The dental implant system can further comprise an abutment comprising: an abutment body having a longitudinal axis, a coronal end and an apical end; an abutment internal bore provided within the abutment body and including an internally threaded portion; a first externally facing surface extending from a location between the coronal end and the apical end of the abutment body and towards the apical end, at least a portion of the first externally facing surface being tapered inwardly towards the apical end of the abutment body; and an external shoulder positioned between the coronal end of the first externally facing surface and the coronal end of the abutment body; wherein a portion of the abutment is configured to be received within the implant internal bore such that the first externally facing surface of the abutment forms a seal with the first internally facing surface of the implant internal bore and the external shoulder of the abutment forms a seal with a coronal end surface of the implant body. The dental implant system can further comprise a fastener insertable within the internal bore of the abutment and configured to engage the internally threaded portion of the abutment and the internally threaded portion of the implant.

In Example 16, the dental implant system of Example 15 can optionally be configured such that the first internally facing surface of the implant is configured to form an interference fit with the first externally facing surface of the abutment.

In Example 17, the dental implant system of Example 16 can optionally be configured such that the first internally facing surface of the implant includes an implant anti-rotation feature configured to mate with an abutment anti-rotation feature included in the first externally facing surface of the abutment, and wherein the implant anti-rotation feature includes a polygon-shaped internal perimeter and the abutment anti-rotation feature includes a polygon-shaped external perimeter.

In Example 18, the dental implant system of any one or any combination of Examples 16 or 17 can optionally be configured to further comprise an implant anti-rotation feature disposed within the implant internal bore between the apical end of the first internally facing surface and a coronal end of the implant internally threaded portion; and an abutment anti-rotation feature disposed between an apical end of the first externally facing surface of the abutment body and the apical end of the abutment body, wherein the implant anti-rotation feature is configured to mate with the abutment anti-rotation feature to inhibit rotation of the implant relative to the abutment.

In Example 19, the dental implant system of Example 18 can optionally be configured such that the implant anti-rotation feature includes a polygon-shaped internal perimeter and the abutment anti-rotation feature includes a polygon-shaped external perimeter.

In Example 20, the dental implant system of any one or any combination of Examples 18 or 19 can optionally be configured such that the implant anti-rotation feature defines a second internally facing surface of the implant internal bore, at least a portion of the second internally facing surface of the implant internal bore being tapered inwardly towards the apical end of the implant internal bore, and wherein the abutment anti-rotation feature defines a second externally facing surface of the abutment body, at least a portion of the second externally facing surface of the abutment body being tapered inwardly towards the apical end of the abutment body.

In Example 21, the dental implant, the dental abutment, and the dental implant system of any one or any combination of Examples 1-20 can optionally be configured such that all elements, operations, or other options recited are available to use or select from.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

It can be desirable to offset a seal connection between a dental implant and a dental abutment inwardly and apically from the outer surfaces of an implant/abutment connection. A tapered connection between the implant and abutment can accomplish moving the sealing connection in this manner. Proper engineering of the length of the tapers and angle of the tapers can produce the tightest fit at a desired location in a tapered connection. The combination of a correctly placed shoulder connection and a tapered connection to an implant/abutment connection can provide stability and strength to the connection as well as an additional sealing surface. The shoulder connection can be accomplished by using an external shoulder on the abutment to engage a mating surface on the implant. The interaction between the implant and abutment tapers for the conical connection and the placement of the shoulder can be precise to provide the proper preload on both the conical connection seal and the shoulder seal. The shoulder provides an exact vertical limit to the apical movement of the abutment as it is tightened down into the implant by a connecting fastener. This limit provides two advantages: it prevents the abutment cone from over stressing the implant conical features and it provides a repeatable vertical placement of the abutment. An additional advantage is that a fastener can be torqued to the point of stretching the fastener. The vertical height of the abutment will remain fixed because of the shoulder limit and the stretched fastener will provide added stability to the connection. The shoulder connection can be used in conjunction with either a conical connection or an anti-rotational means connection or in conjunction with both connections together. Another example which can provide added stability is a connection having both an interference fit conical connection and an interference fit anti-rotational connection.

In the following description FIGS. 1, 2A, and 3-9 describe examples containing all three of the components mentioned above, the shoulder connection, the conical connection elements and the anti-rotational means connection features. FIGS. 2B, 2C, and 10-12 describe examples containing only two of the three components and it should be understood that the more detailed description of the elements of FIGS. 1, 2A, and 3-9 can also apply to the examples described in FIGS. 2B, 2C, and 10-12.

Figure 1:
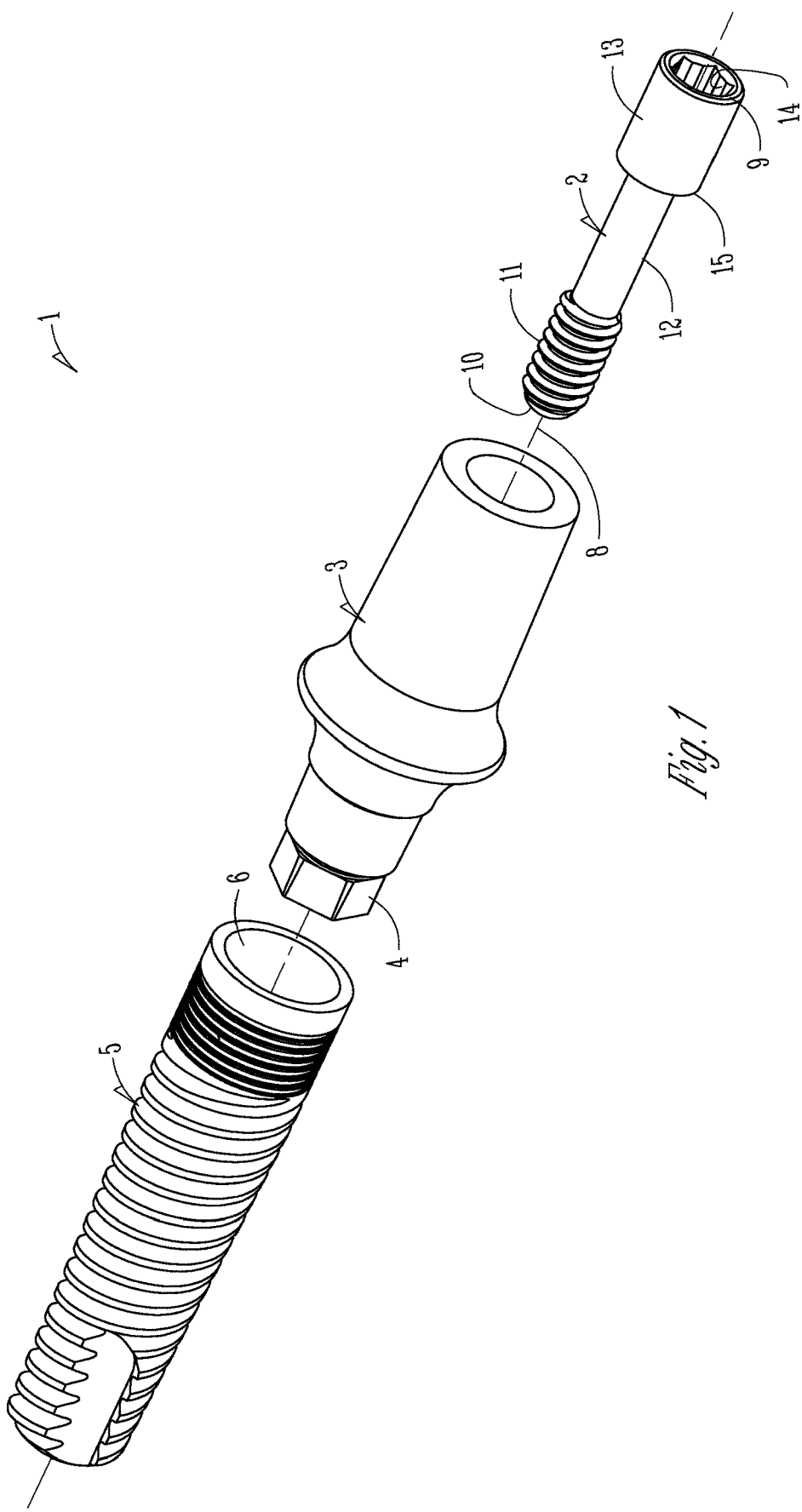
FIG. 1 is an isometric exploded view of the dental implant system showing a fastener, an abutment and an implant.

FIG. 1 illustrates an example of a dental prosthetic apparatus 1 including a dental implant 5, an abutment 3, and a connecting fastener 2. The dental prosthetic apparatus 1 can provide an anchor for a prosthetic tooth (e.g., a crown)

in an oral site where teeth are damaged or missing. The abutment 3 can include a base 4 configured to mate with the dental implant 5. The base 4 can be compared to features at the apical end of the abutment 3 and can vary (see FIGS. 5, 10, 11, 12). The base 4 can be frictionally retained by a similarly-shaped recess 6 formed in the dental implant 5. In an example, the base 4 can have a polygonal exterior surface including a plurality of flat surfaces. The base 4 can be an anti-rotational component. The recess 6 in the dental implant 5 can include a polygonal shaped internal perimeter 7 (see FIG. 3) including a plurality of generally flat surfaces configured to mate with the base 4 of the abutment 3.

The fastener 2 can include a longitudinal axis 8 extending between a fastener coronal end 9 and a fastener apical end 10. The fastener can have fastener threads 11 extending towards the fastener apical end 10. The fastener can include a shank portion 12 that is unthreaded between a fastener head 13 and the fastener apical end 10. The fastener head 13 can have a drive means 14 which could include a slotted form, a hex form, a torx form, a Phillips head form or any other driving means form. On the apical end of the fastener head 13, the fastener 2 can include a fastener shoulder surface 15 which is substantially transverse to the longitudinal axis 8 of the fastener 2. In another example the fastener shoulder surface 15 can be a beveled surface.

Figure 2A:
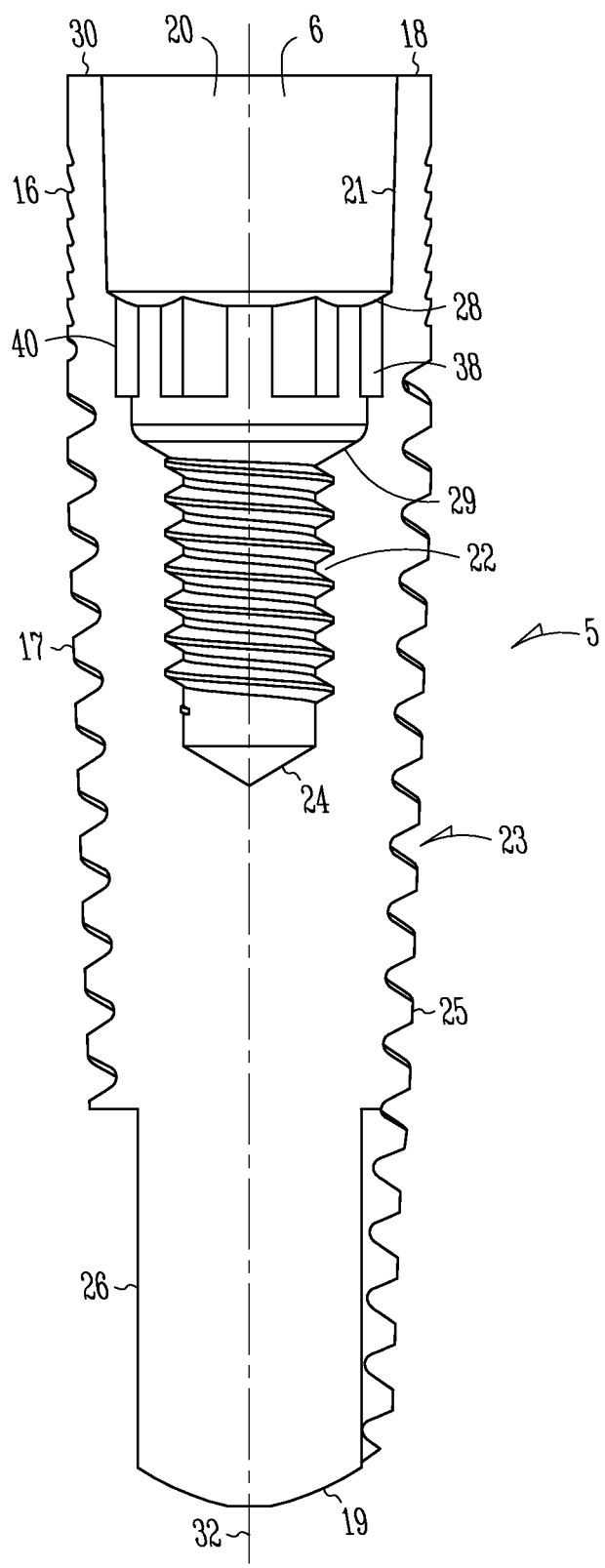
FIG. 2A is a cross-sectional side view of an implant in accordance with the present patent document.

FIG. 2A illustrates a dental implant 5 in cross section. The dental implant 5 can be fitted into a dental cavity formed in a patient's dental bone. The dental implant 5 can include a collar portion 16. The collar portion 16 can be the portion of the dental implant 5 forming the recess 6 in which the base 4 (See FIG. 1) of the abutment is inserted. The exterior surface of the collar portion 16 can be threaded, partially threaded, ridged, non-threaded, or saw toothed, the latter of which is pictured in FIG. 2A. The collar portion 16 may not be present in all examples.

The dental implant 5 can include a longitudinally extending implant body 17, having a coronal end 18 and an apical end 19, adapted to be implanted into a dental cavity formed in the dental bone of a patient. The dental cavity can be formed according to known surgical techniques, for example, by a surgeon drilling into a patient's jaw bone at an edentulous site. The implant body 17 can include an externally facing surface 23 for interacting with bone tissue, thereby securing the dental implant 5 to the dental bone through osseointegration or other biological or mechanical interactions. The implant body 17 can be made of a biocompatible metal, for example, titanium or other biocompatible material such as polymer or ceramic.

The implant body 17 can be cylindrical, partially cylindrical, or tapered in shape. The implant body 17 can include an implant internal bore 20 extending from the coronal end 18 to an apical termination point 24, such as is illustrated in FIG. 2A. The implant internal bore 20 can include an implant internally threaded portion 22 configured to interact with the fastener threads 11 of the fastener 2 to secure the abutment 3 to the dental implant 5 (See FIG. 1). The implant body 17 may include the whole length of the implant 5 or a portion of it.

The dental implant 5 can include continuous or discrete external threads 25 along a portion or whole of the implant externally facing surface 23. The external threads 25 can be in the form of single, double or multiple helical threads. To facilitate osseointegration, portions of the implant externally facing surface 23 can include a porous biomaterial useful as a bone substitute or cell and tissue receptive material. Additionally, portions of the externally facing surface 23 can be provided with a porous and osteo-inductive coating, such as hydroxylapatite.

Highly porous biomaterials can be called highly biocompatible materials. Highly biocompatible materials can include porous metallic structures such as porous tantalum, porous titanium, porous cobalt chrome, or porous zirconia dioxide, as well as polymeric scaffolds, or porous sections of the aforementioned materials incorporating bone morphogenic proteins, platelet rich plasma, allografts, xenografts, autografts, or probiotic bacteria.

At the coronal end of the implant, the recess 6 can be continuous with the implant internal bore 20. The coronal end 18 can include a coronal sealing surface 30 which can be substantially perpendicular to the longitudinal axis 32 of the implant 5. The recess 6 can have a first internally facing surface 21 and optionally a second internally facing surface 40. The first internally facing surface 21 can be tapered inwardly towards the implant apical end 19. The taper can optionally range from 1-18 degrees. In an example, the taper can optionally range from 1-15 degrees. In an example, the taper can optionally range from 1-12 degrees. In an example, the taper can optionally range from 1-9 degrees. In an example, the taper can optionally range from 1-6 degrees. In an example, the taper can optionally range from 1-3 degrees. In an example, the taper can optionally range from 3-18 degrees. In an example, the taper can optionally range from 6-18 degrees. In an example, the taper can optionally range from 9-18 degrees. In an example, the taper can optionally range from 12-18 degrees. In an example, the taper can optionally range from 15-18 degrees.

At the apical end of the first internally facing surface 21 there can be a first transition zone 28 which can form a gradual change in morphology between the apical end of the first internally facing surface 21 and the coronal end of the second internally facing surface 40. The second internally facing surface 40 can include an implant anti-rotational means 38 which can be designed to engage with an abutment anti-rotational means 57 (See FIG. 5). The anti-rotational means could comprise mating polygonal shapes, mating slotted structures having one or more keyways, mating lobed structures, or any other type of mating structures which resist rotational movement when the mating structures of the abutment and implant are combined. The second internally facing surface 40 can be tapered inwardly towards the implant apical end 19. The taper can optionally range from 0.2-18 degrees. In an example, the taper can optionally range from 0.2-15 degrees. In an example, the taper can optionally range from 0.2-12 degrees. In an example, the taper can optionally range from 0.2-9 degrees. In an example, the taper can optionally range from 0.2-6 degrees. In an example, the taper can optionally range from 0.2-3 degrees. In an example, the taper can optionally range from 3-18 degrees. In an example, the taper can optionally range from 6-18 degrees. In an example, the taper can optionally range from 9-18 degrees. In an example, the taper can optionally range from 12-18 degrees. In an example, the taper can optionally range from 15-18 degrees. The first internally facing surface 21 can be configured to include anti-rotational means and if so a second internally facing surface 40 may not be present as shown in FIG. 2C.

At the apical end of the second internally facing surface 40 there can be a second transition zone 29 which can form a gradual change in morphology between the apical end of the second internally facing surface 40 and the coronal end of the implant internally threaded portion 22. In an area of the externally facing surface 23 towards the implant apical end 19 the implant 5 can include a thread cutting portion 26 that has no external threads 25 that can aid the implant 5 in producing threads in a bony structure of a patient during installation of the implant 5. Other thread cutting means, such as self tapping threads can also be used.

Figure 2B:
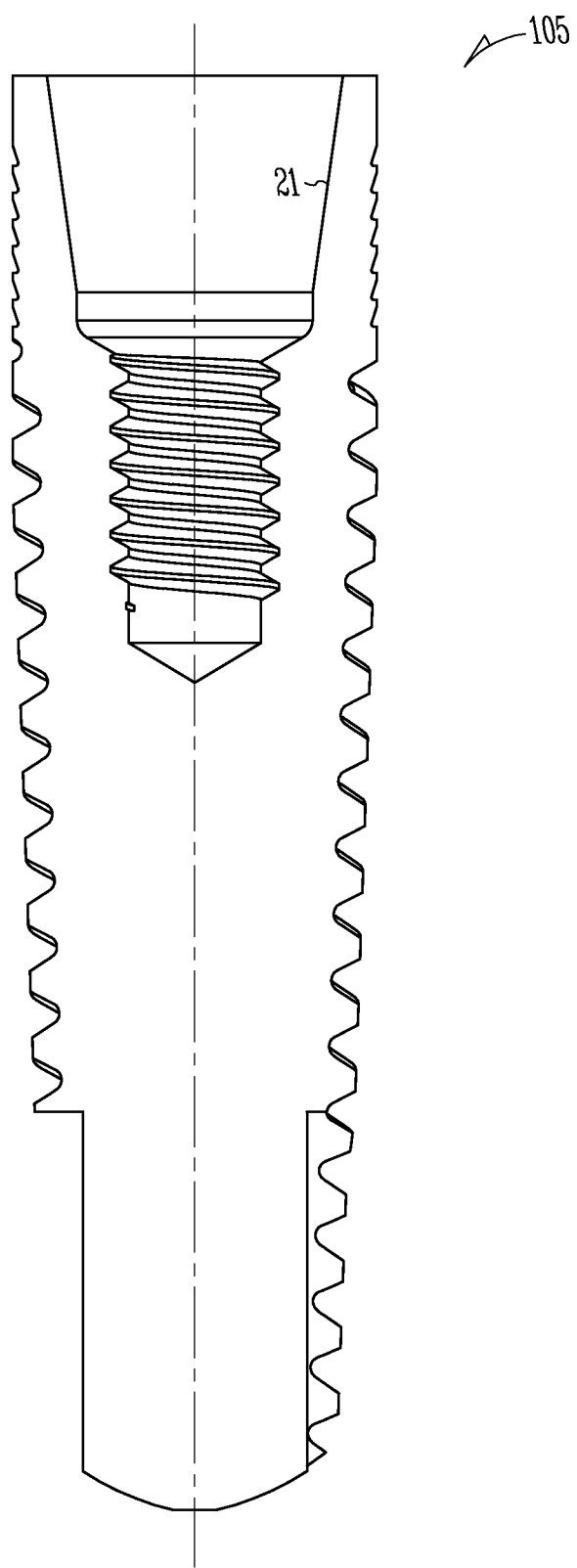
FIG. 2B is a cross-sectional side view of an implant in accordance with the present patent document.

FIG. 2B illustrates an implant with a cone 105. Note how the first internally facing surface 21 can be present and the anti-rotational means 38 (see FIG. 2A) is not present.

Figure 2C:
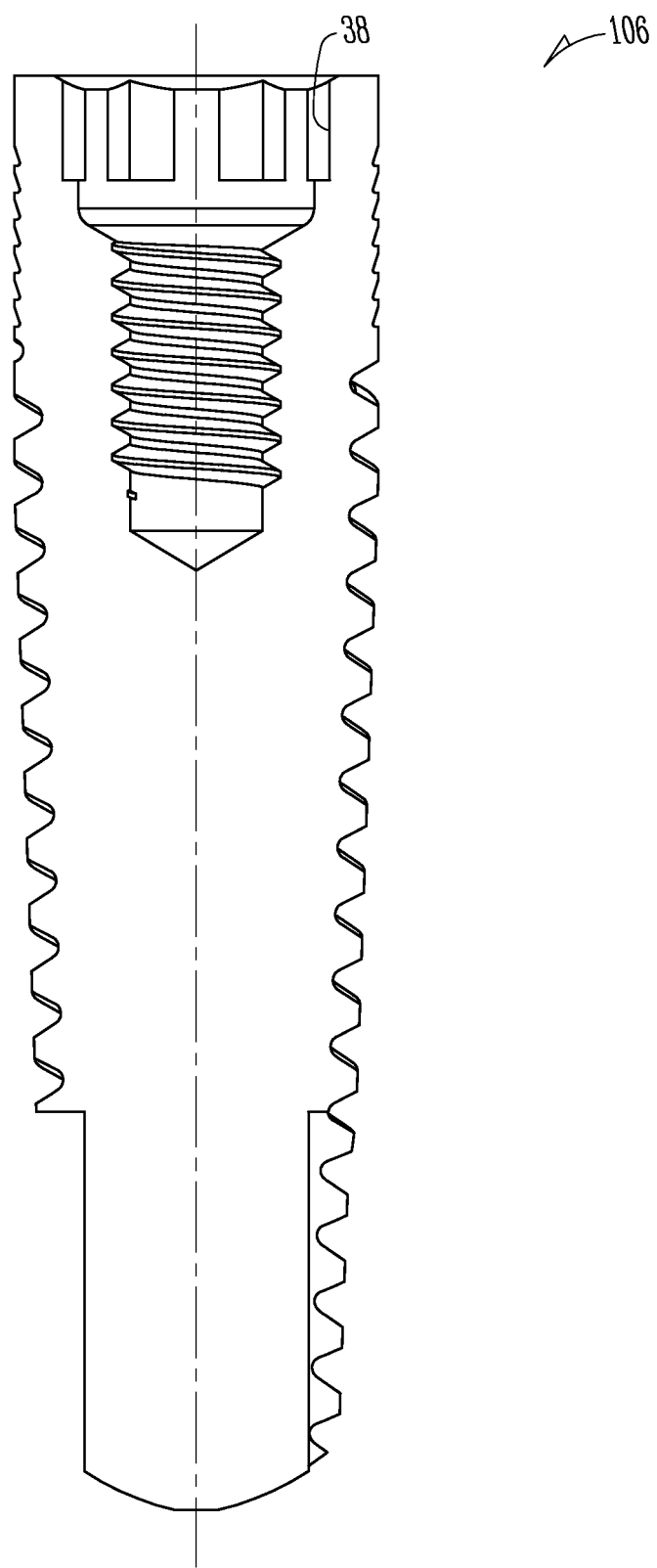
FIG. 2C is a cross-sectional side view of an implant in accordance with the present patent document.

FIG. 2C illustrates an implant without a cone 106. Note that anti-rotational means 38 is present and there is no second internally facing feature 40 (see FIG. 2A).

Figure 3:
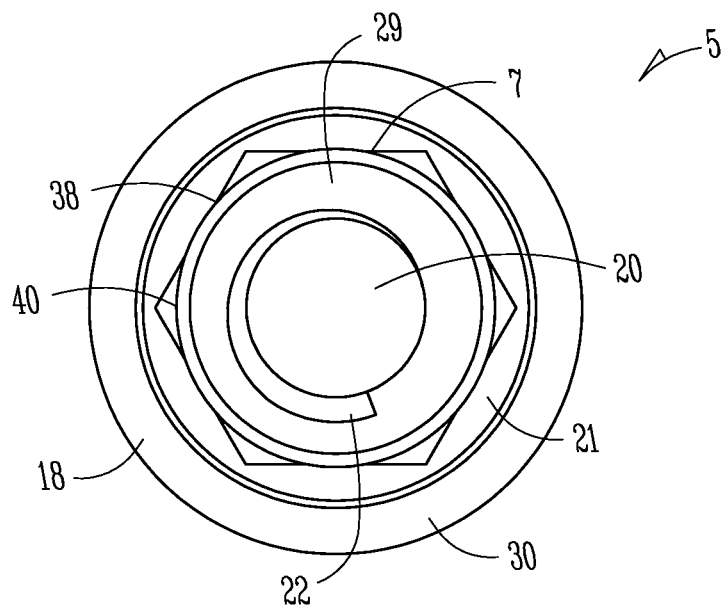
FIG. 3 is a coronal end view of the implant of FIG. 2A.

FIG. 3 illustrates a top end view of an implant 5. The implant internal bore 20 is continuous with the recess 6 (see FIG. 2A) which can include an implant first internally facing surface 21 and optionally a second internally facing surface 40. The second internally facing surface 40 can include an anti-rotational means 38. The implant anti-rotational means 38 can be configured to form a locking connection with an abutment 3 (see FIG. 1). The internal perimeter 7 of the implant anti-rotational means 38 can take the form of a polygon, such as a hex, a square or other polygonal shape. In an example, the internal perimeter 7 could also take an irregular shape. The implant anti-rotational means 38 can also serve a dual purpose as a driving means for installing the implant 5 into a bony structure. A second transition zone 29 can be disposed between the apical end of the second internally facing surface 40 and the coronal end of the implant internally threaded portion 22. The second transition zone 29 can help guide the apical end of a fastener 2 (see FIG. 1) into the internal threads 22 and can be a beveled surface. The implant coronal end 18 can include a coronal sealing surface 30 which can be substantially transverse to the longitudinal axis 32 (See FIG. 2A) of the implant 5. The first internally facing surface 21 can be configured to include anti-rotational means and if so, a second internally facing surface 40 may not be present as shown in FIG. 2C.

Figure 4:
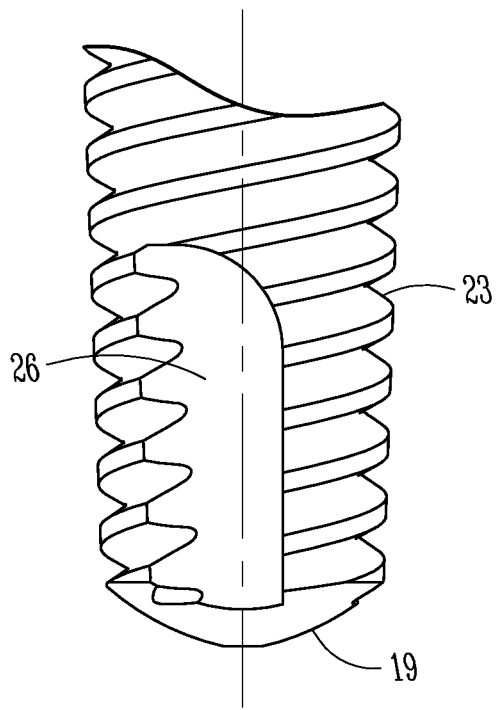
FIG. 4 is a partial side view of the implant of FIG. 2A showing an implant retaining means in accordance with the present patent document.

FIG. 4 is an example of a thread cutting portion 26 on the implant apical end 19. The thread cutting portion 26 can be in single, double or multiple configurations disposed around the implant externally facing surface 23.

Figure 5:
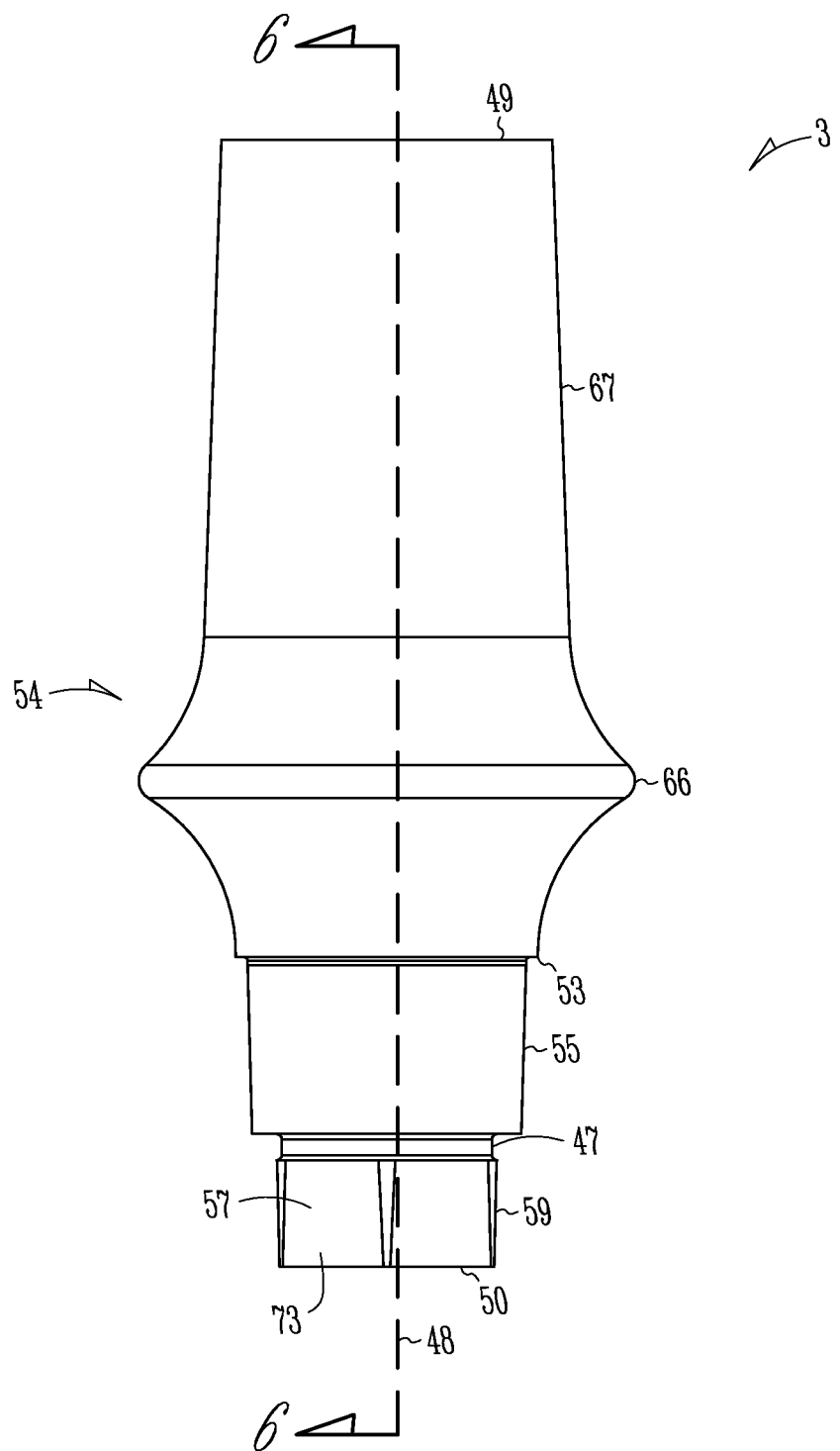
FIG. 5 is a side view of an abutment in accordance with the present patent document.

FIG. 5 illustrates a side view of an abutment 3 which can include an abutment longitudinal axis 48 and an abutment body 54 extending from the abutment coronal end 49 to the abutment apical end 50. The abutment 3 can include a transgingival portion 66 configured to extend through soft gingival tissue, and a supragingival portion 67 configured to extend in the coronal direction beyond the transgingival portion 66 and attach to a prosthetic tooth (not pictured; e.g., a crown). The dimensions and shapes of the transgingival portion 66 and the supragingival portion 67 of the abutment 3 can be varied to match the needs of each individual patient. Factors such as the amount of space available and the orientation of the implant can influence the surgeon's decision on the abutment to select when performing a tooth restoration on a patient.

The abutment 3 can include an external shoulder 53 disposed near the apical end of the transgingival portion 66. The apical surface of the external shoulder 53 can be substantially transverse to the longitudinal axis 48 of the abutment body 54. The shoulder 53 can be configured to engage a coronal sealing surface 30 of an implant 5 (see FIG. 2A). The abutment 3 can include a first externally facing surface 55 which can be positioned between the external shoulder 53 and the abutment apical end 50. The first externally facing surface 55 can taper inwardly towards the abutment apical end 50. The taper can optionally range from 1-18 degrees. In an example, the taper can optionally range from 1-15 degrees. In an example, the taper can optionally range from 1-12 degrees. In an example, the taper can optionally range from 1-9 degrees. In an example, the taper can optionally range from 1-6 degrees. In an example, the taper can optionally range from 1-3 degrees. In an example, the taper can optionally range from 3-18 degrees. In an example, the taper can optionally range from 6-18 degrees. In an example, the taper can optionally range from 9-18 degrees. In an example, the taper can optionally range from 12-18 degrees. In an example, the taper can optionally range from 15-18 degrees.

The abutment can include an abutment anti-rotational means 57 disposed between the apical end of the first externally facing surface 55 and the abutment apical end 50. The abutment anti-rotational means 57 can include a polygon 73 or various anti-rotational shapes noted above. The abutment anti-rotational means 57 can include a second externally facing surface 59. At least a portion of the second externally facing surface 59 can be configured to taper inwardly towards the abutment apical end 50. The taper can optionally range from 0.2-18 degrees. In an example, the taper can optionally range from 0.2-15 degrees. In an example, the taper can optionally range from 0.2-12 degrees. In an example, the taper can optionally range from 0.2-9 degrees. In an example, the taper can optionally range from 0.2-6 degrees. In an example, the taper can optionally range from 0.2-3 degrees. In an example, the taper can optionally range from 3-18 degrees. In an example, the taper can optionally range from 6-18 degrees. In an example, the taper can optionally range from 9-18 degrees. In an example, the taper can optionally range from 12-18 degrees. In an example, the taper can optionally range from 15-18 degrees. A groove 47 can be disposed between the first externally facing surface 55 and the second externally facing surface 59. The groove can aid in manufacturing and in locating the largest diameter of the second externally facing surface 59.

Figure 10:
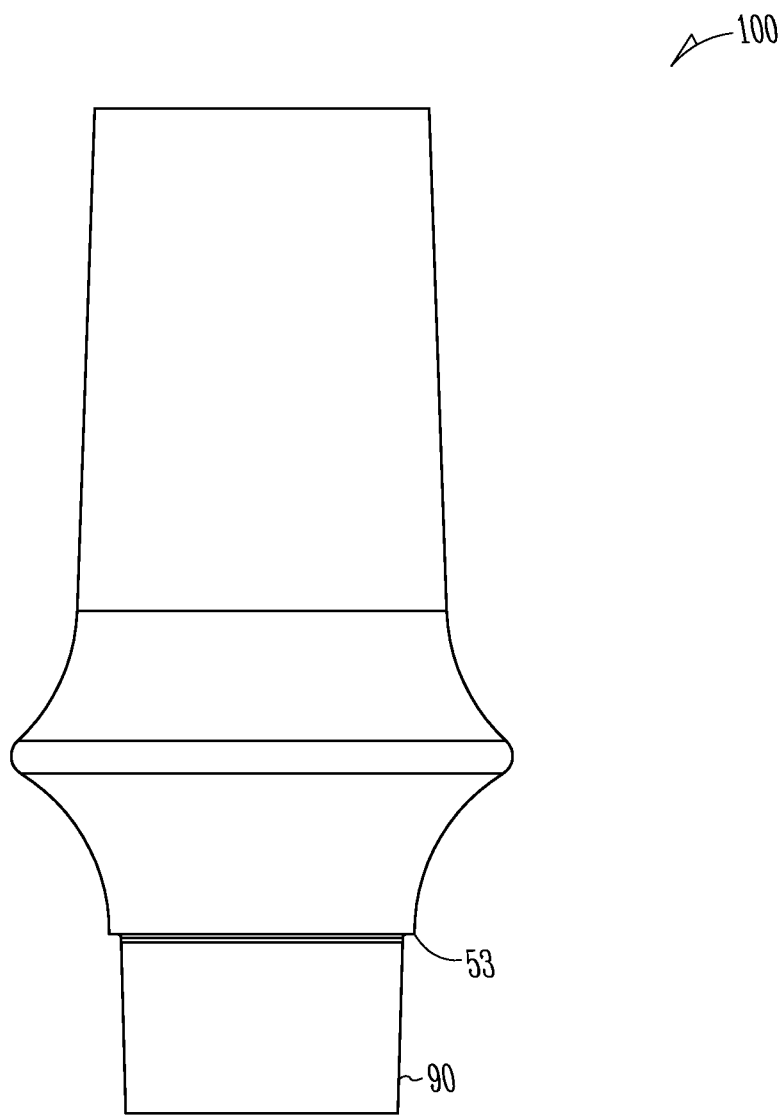
FIG. 10 is a side view of an abutment in accordance with the present patent document.

FIG. 10 illustrates an abutment 100 that includes a shoulder 53 and a cone 90. The cone can be comparable to the first externally facing surface 55 of FIG. 5.

Figure 11:
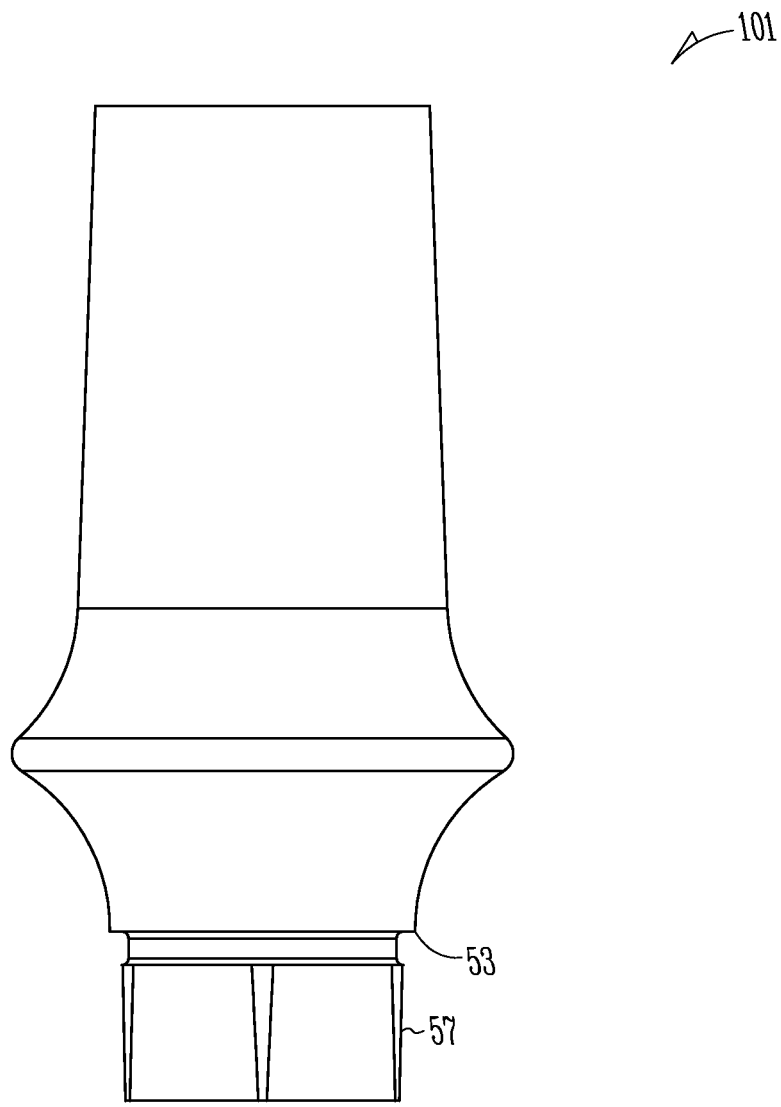
FIG. 11 is a side view of an abutment in accordance with the present patent document.

FIG. 11 illustrates an abutment 101 that includes a shoulder 53 and an anti-rotational means 57.

Figure 12:
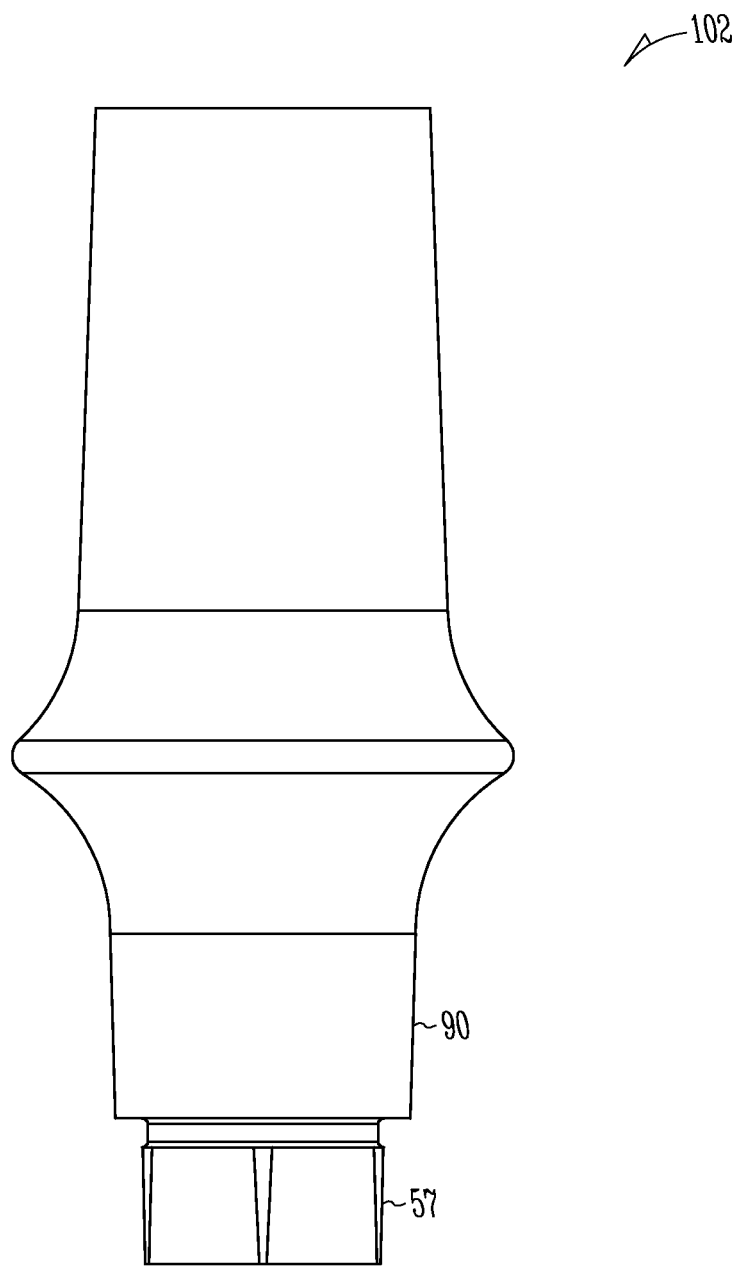
FIG. 12 is a side view of an abutment in accordance with the present patent document.

FIG. 12 illustrates an abutment 102 that includes a cone 90 and an anti-rotational means 57. Note that this configuration does not include a shoulder 53 (see FIG. 5) and both the cone 90 and the anti-rotational means 57 can be configured to form an interference fit with mating features of an implant.

The abutments 3, 100, 101, and 102 from FIGS. 5, 10, 11, and 12 respectively can be manufactured from a variety of biocompatible materials, such as aluminum oxide, zirconium oxide, commercially pure titanium, titanium alloy, ceramic, or gold. In addition, portions of the abutments 3, 100, 101, and 102 (e.g., the transgingival portion 66) can be anodized or coated with a nitride material, such as titanium nitride or another colorizing agent to provide a desired color or other surface property. Titanium nitride coating can create a golden, more aesthetically pleasing color on the surface of the abutment as compared with untreated titanium. Portions of the abutment 3, 100, 101, and 102 can also be treated, coated, or roughened to promote soft tissue adhesion or growth in the areas on or adjacent to the treated surfaces.

Figure 6:
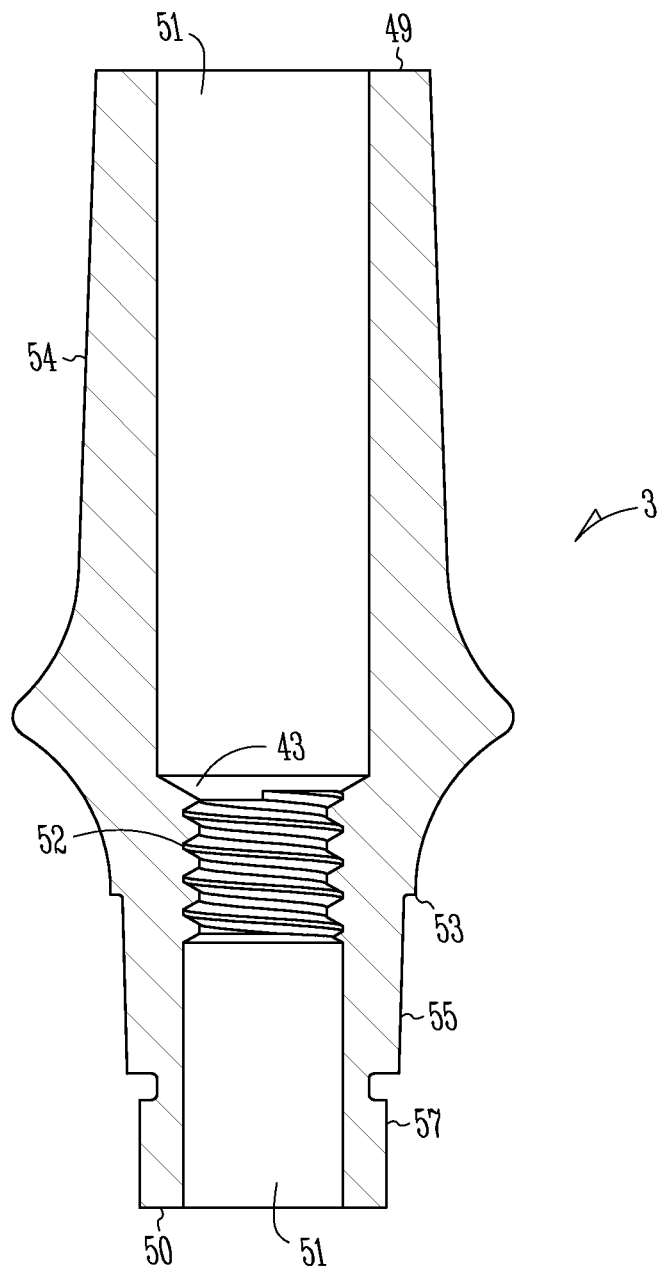
FIG. 6 is a cross-sectional side view of the abutment of FIG. 5.

FIG. 6 illustrates an abutment 3 in cross a sectional view taken from FIG. 5 along line 6-6 and shows the abutment body 54 disposed between the abutment coronal end 49 and the abutment apical end 50. An abutment internal bore 51 can extend from the abutment coronal end to the abutment apical end 50. The abutment internal bore 51 can include an abutment internally threaded portion 52. Between the abutment coronal end 49 and the abutment internally threaded portion 52, the abutment can include a step portion 43 which can be configured to prevent apical movement of the fastener shoulder surface 15 (see FIG. 1). The external shoulder 53 can be located at the coronal end of the first externally facing surface 55. The abutment anti-rotational means 57 can be located near the abutment apical end 50. The abutments 100, 101, and 102 of FIGS. 10-12 can have similar cross sections for the elements that are present in these configurations.

Figure 7:
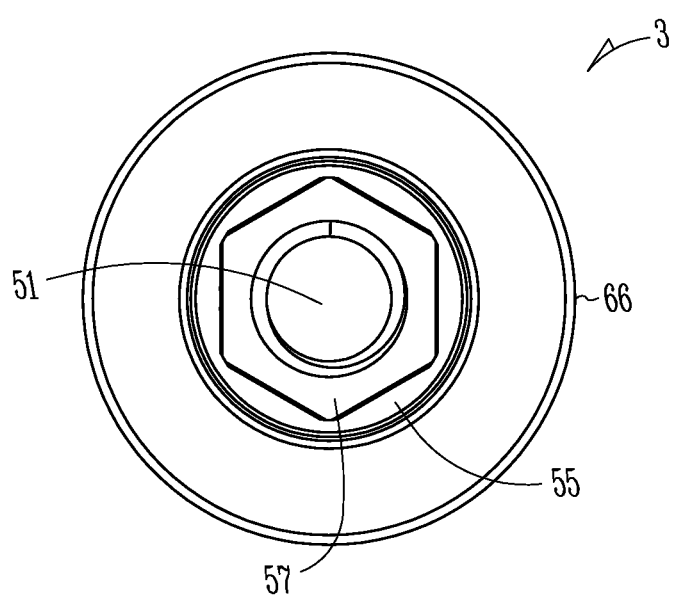
FIG. 7 is an apical end view of the abutment of FIG. 5.

In FIG. 7 an apical view of the abutment 3 is shown. The transgingival portion 66 can be an area of greatest diameter of the abutment 3. The abutment internal bore 51, can pass through the center of the abutment 3. The abutment anti-rotational means 57 illustrated are in a hexagonal form, but can be contemplated in any regular or irregular polygonal shape. The abutment first externally facing surface 55 can provide a long sealing surface and include an interference fit with an implant.

Figures 8, 9:
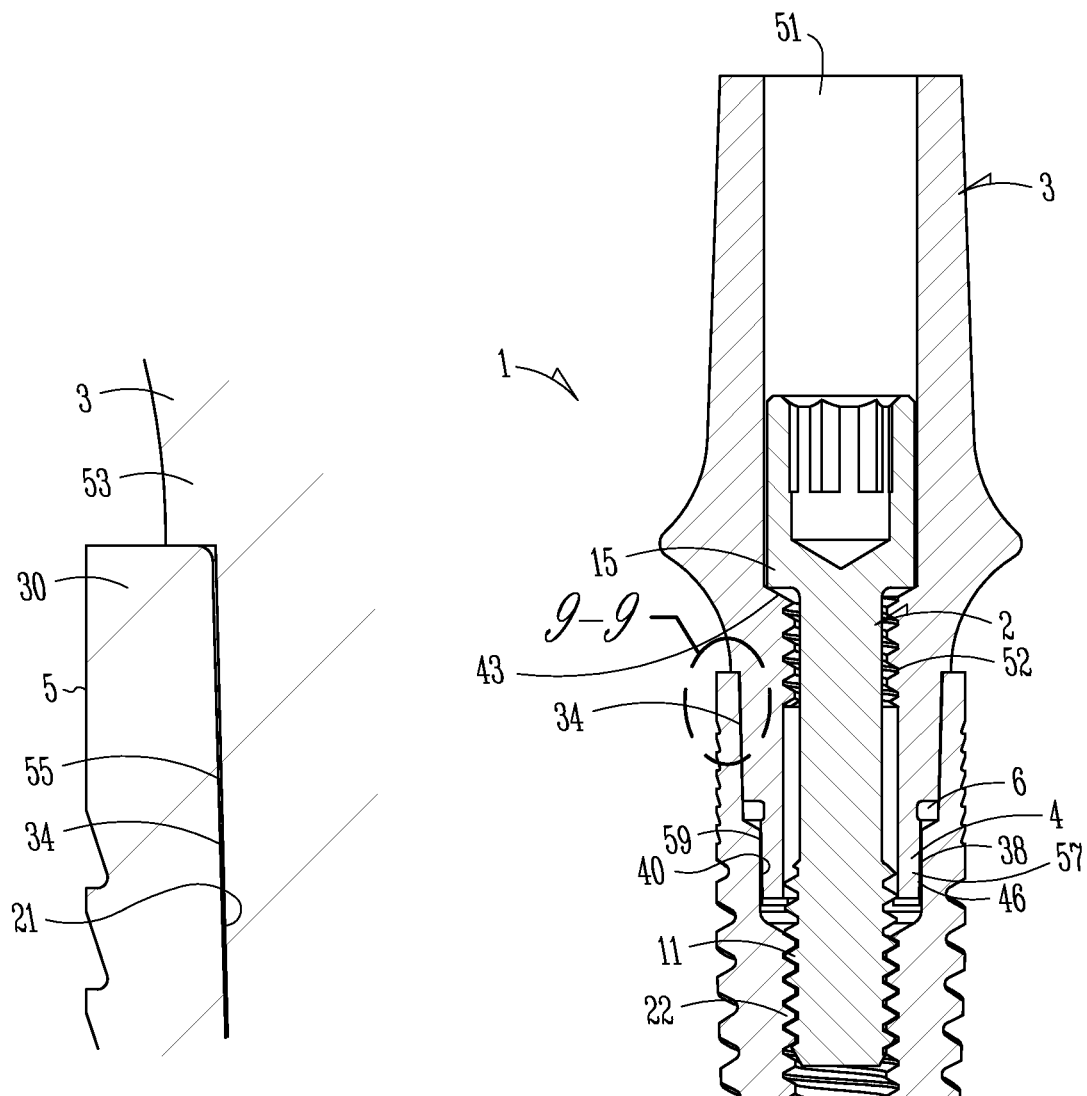
FIG. 8 is a cross sectional view of the assembled implant, abutment and fastener.
FIG. 9 is an enlarged fragmentary view of the connection between the abutment and implant.

FIG. 8 illustrates an assembled dental prosthetic apparatus 1. The abutment 3 can be mounted to the dental implant 5 by inserting the base 4 into the recess 6 and then inserting the fastener 2 into the coronal end of the abutment internal bore 51. The fastener 2 can be inserted through abutment internal bore 51, with the fastener threads 11 being threaded into an implant internally threaded portion 22 of an implant internal bore 20 of the dental implant 5. The fastener 2 can be threaded until the fastener shoulder surface 15 abuts the step 43 of the abutment internal bore 51. In another example the fastener 2 can have threads 11 such that the abutment internal threads 52 and implant internal threads 22 are both engaged when the fastener 2 is tightened.

FIG. 9 is an enlargement view taken from FIG. 8 at 9-9 and is a close up view of a shoulder connection between the implant 5 and the abutment 3. The abutment first externally facing surface 55 can be configured to form a first interference fit 34 with the implant first internally facing surface 21. This interference fit 34 can form a seal which can prevent a transfer of micro-particles from the internal portions of the dental prosthetic apparatus 1 to the living tissues surrounding it.

The first interference fit 34 can be configured to form a seal in the connection between the abutment first externally facing surface 55 and the implant first internally facing surface 21 substantially simultaneously as the abutment external shoulder 53 seats upon the coronal sealing surface 30 of the implant 5. The seating of the external shoulder 53 can prevent further apical movement of the abutment first externally facing surface 55 relative to the implant 5. The seating of the external shoulder 53 can provide a secondary sealing connection between the abutment 3 and the implant 5. The seating of the external shoulder 53 can also prevent cracking in the recess 6 (see FIG. 8) of the implant 5 should the tapered connection be over-tightened by the fastener 2 (see FIG. 8). Once the external shoulder 53 has seated on the coronal sealing surface 30, the fastener 2 can be tightened to the point of stretching. Because the external shoulder 53 limits apical movement of the abutment 3, a stretched fastener can provide additional holding force to prevent the abutment 3 from loosening over time.

Returning to FIG. 8, the abutment second externally facing surface 59 can engage the implant second internally facing surface 40. The engagement can include abutment anti-rotational means 57 and complementary implant anti-rotational means 38 that further limit movement of the abutment 3 relative to the implant 5 and also provide an indexing means for a surgeon performing a restoration. The anti-rotational means may take the form of a polygon, such as a hex shape. The engagement of the abutment second externally facing surface 59 and the implant second internally facing surface 40 may be a second interference fit such as at 46.

The above Detailed Description includes references to the accompanying drawings, which form a part of the Detailed Description. The drawings show, by way of illustration, specific embodiments in which the present dental implant can be practiced. These embodiments are also referred to herein as "examples."

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "about" and "approximately" are used to refer to an amount that is nearly, almost, or in the vicinity of being equal to a stated amount. In this document, the term "patient" is intended to include mammals, such as for human documents or veterinary documents.

In the appended claims, the terms "including" and "in which" are used as the plain-English equivalents of the respective terms "comprising" and "wherein." Also, in the following claims, the terms "including" and "comprising" are open-ended, that is, an implant, assembly, kit, or method that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to allow the reader to quickly ascertain the nature of the technical disclosure. It is submitted with the understanding that it will not be used to interpret or limit the scope or meaning of the claims.

What is claimed is:

1. A dental implant, comprising:
   an implant body, wherein a central longitudinal axis extends through the implant body between a coronal end and an apical end of the implant body;
   an implant internal bore, provided within the implant body, having a coronal end adjacent to the coronal end of the implant body and an apical end, the implant internal bore including a first internally-facing surface, extending from the coronal end of the implant internal bore towards the apical end of the implant internal bore, at least a portion of the first internally-facing surface tapering towards the apical end of the implant internal bore by a degree configured to establish a first interference fit with a first portion of a dental abutment, wherein the implant internal bore includes an anti-rotation geometry defined by a plurality of inwardly-facing, each of which faces towards the central longitudinal axis and is positioned apically of the first internally-facing surface within the implant internal bore, the plurality of surfaces defining the anti-rotation geometry all being tapered along and towards the central longitudinal axis in a coronal-apical direction by a degree configured to establish a second interference fit with a second portion of the dental abutment, wherein the implant internal bore forms a transition zone having a gradual change in geometry from the first internally-facing surface to the anti-rotation geometry, and wherein in combination the first interference fit and the second interference fit mate the dental implant to the dental abutment; and the implant internal bore further including an internally threaded portion positioned between an apical end of the first internally facing surface and the apical end of the implant internal bore.

2. The dental implant of claim 1, wherein the anti-rotation geometry includes a polygon-shaped internal recess within the implant internal bore.

3. The dental implant of claim 1, wherein the anti-rotation geometry is disposed within the implant internal bore, between the apical end of the first internally-facing surface and a coronal end of the internally threaded portion.

4. The dental implant of claim 1, wherein the degree of taper of the first internally-facing surface is anywhere between 1-18°.

5. The dental implant of claim 1, wherein the coronal end of the implant body includes an externally-facing surface oriented substantially transverse to the longitudinal axis that is structured to engage an external shoulder portion of an abutment.

6. The dental implant of claim 1, wherein the transition zone is one of two transition zones each defining a ledge oriented substantially transverse to the longitudinal axis and being positioned apically of one another within the implant internal bore.

7. The dental implant of claim 1, wherein the implant body has an outer surface, and wherein a first apical section of the outer surface is threaded, and a second section of the outer surface positioned coronally of the first section is non-threaded.

8. The dental implant of claim 1, wherein the degree of taper of the plurality of surfaces defining the anti-rotation geometry is anywhere between 0.2-18°.

9. A dental implant system comprising the dental implant of claim 1 and an abutment insertable into the implant internal bore, the abutment comprising an abutment body defining a coronal end, an apical end, and a central longitudinal axis, wherein the implant internal bore includes the transition zone defining a ledge, and the abutment is sized and shaped so that when the abutment is inserted into the implant internal bore, the apical end of the abutment is spaced apart a distance coronally away from the ledge of the transition zone and has a groove in the transition zone.

10. The dental implant system of claim 9, wherein the abutment comprises a first externally-facing surface, at least a portion of which is tapered towards the apical end of the abutment body, and the first externally-facing surface is configured to mate with the first internally-facing surface of the implant internal bore and establish the first interference fit therebetween when the abutment is inserted into the implant internal bore.

11. The dental implant system of claim 10, wherein the abutment comprises an anti-rotation geometry defined by a plurality of externally-facing surfaces, each of which is tapered along and towards the central longitudinal axis of the abutment body, and wherein the plurality of externally-facing surfaces are configured to mate with the plurality of internally-facing surfaces defining the anti-rotation geometry of the implant, such that the second interference fit is established therebetween when the abutment is inserted into the implant internal bore.

12. The dental implant system of claim 11, wherein the anti-rotation geometry of the implant body is configured to mate with the anti-rotation geometry of the abutment body so that the implant body is non-rotatably mated to the abutment body.

13. The dental implant system of claim 12, wherein the anti-rotation geometry of the implant body is a recess and the anti-rotation geometry of the abutment is a protrusion.

14. A dental abutment, comprising:

an abutment body, wherein a central longitudinal axis extends through the abutment body between a coronal end and an apical end of the abutment body, the abutment body including a first externally-facing surface extending towards the apical end, at least a portion the first externally-facing surface tapering towards the apical end by a degree configured to establish a first interference fit with a first portion of a dental implant, and wherein the abutment body includes an anti-rotation geometry defined by a plurality of externally-facing surfaces, each of which faces away from the central longitudinal axis and is positioned apically of the first externally-facing surface, the plurality of externally-facing surfaces defining the anti-rotation geometry all being tapered along and towards the central longitudinal axis in a coronal-apical direction by a degree configured to establish a second interference fit with a second portion of the dental implant, wherein the abutment body includes a groove positioned longitudinally between the first externally-facing surface and the anti-rotation geometry, and wherein in combination the first interference fit and the second interference fit mate the dental abutment to the dental implant.

15. The dental abutment of claim 14, wherein the anti-rotation geometry includes a polygon-shaped protrusion.

16. The dental abutment of claim 14, wherein the anti-rotation geometry is positioned between an apical end of the first externally-facing surface and the apical end of the abutment body.

17. The dental abutment of claim 14, wherein the degree of taper of the first externally-facing surface is anywhere between 1-18°, and the degree of taper of the plurality of externally-facing surfaces defining the anti-rotation geometry is anywhere between 0.2-18°.

18. The dental abutment of claim 14, further comprising an external shoulder positioned between a coronal end of the first externally-facing surface and the coronal end of the abutment body, wherein the external shoulder is oriented substantially transverse to the longitudinal axis and the external shoulder is configured to seat upon an externally-facing surface of an implant body.

19. The dental abutment of claim 14, wherein an internal bore is provided within the abutment body, the internal bore having a ledge configured to engage with a part of a fastener.

20. A dental implant system comprising:
an implant comprising:
an implant body, wherein a central longitudinal axis extends through the implant body between a coronal end and an apical end of the implant body;
an implant internal bore, provided within the implant body, having a coronal end adjacent to the coronal end of the implant body and an apical end;
a first internally-facing surface extending from the coronal end of the implant internal bore towards the apical end of the implant internal bore, at least a portion of the first internally-facing surface being tapered towards the apical end of the implant internal bore;
an anti-rotation geometry defined by a plurality of internally-facing surfaces, each of which faces towards the central longitudinal axis of the implant body and is positioned apically of the first internally-facing surface, the plurality of internally-facing surfaces defining the anti-rotation geometry being tapered along and towards the central longitudinal axis of the implant body within the implant internal bore in a coronal-apical direction;
a transition zone having a gradual change in geometry from the first internally-facing surface to the anti-rotation geometry; and
an internally threaded portion positioned within the implant internal bore between an apical end of the first internally-facing surface and the apical end of the implant internal bore;
an abutment comprising:
an abutment body, wherein a central longitudinal axis extends through the abutment body between a coronal end and an apical end of the abutment body;
an abutment internal bore provided within the abutment body;
a first externally-facing surface extending from a location between the coronal end and the apical end of the abutment body and towards the apical end, at least a portion of the first externally facing surface being tapered towards the apical end of the abutment body; and
an anti-rotation geometry defined by a plurality of externally-facing surfaces, each of which faces away from the central longitudinal axis of the abutment body and is positioned apically of the first externally-facing surface, the plurality of externally-facing surfaces defining the anti-rotation geometry being tapered along and towards the central longitudinal axis of the abutment body in the coronal-apical direction;
a groove positioned longitudinally between the first externally-facing surface and the anti-rotation geometry;
wherein, when the abutment is mounted to the implant, a portion of the abutment is received within the implant internal bore, such that the first externally-facing surface of the abutment forms a first interference-fit with the first internally-facing surface of the implant internal bore, and the plurality of externally-facing surfaces defining the anti-rotation geometry of the abutment forms a second interference-fit with the plurality of internally-facing surfaces defining the anti-rotation geometry of the implant internal bore and the groove of the abutment is positioned within the transition zone of the implant internal bore, and wherein in combination the first interference fit and the second interference fit mate the dental implant to the dental abutment; and a fastener insertable within the internal bore of the abutment, the fastener being configured to simultaneously engage a portion of the abutment and the internally threaded portion of the implant.

21. The dental implant system of claim 20, wherein the anti-rotation geometry of the implant body includes a polygon-shaped internal recess, and the anti-rotation geometry of the abutment includes a polygon-shaped protrusion that is configured to mate with the polygon-shaped internal recess.

22. The dental implant system of claim 21, wherein the anti-rotation geometry of the implant body is disposed within the implant internal bore between the apical end of the first internally-facing surface and a coronal end of the implant internally threaded portion, and the anti-rotation geometry of the abutment body is disposed between an apical end of the first externally-facing surface of the abutment body and the apical end of the abutment body.

23. The dental implant system of claim 20, wherein the first internally-facing surface of the implant and the first externally-facing surface of the abutment are tapered by anywhere between 1-18°, and the plurality of internally-facing surfaces defining the anti-rotation geometry of the implant and the plurality of externally-facing surfaces defining the anti-rotation geometry of the abutment are tapered by anywhere between 0.2-18°.

24. The dental implant system of claim 20, wherein the implant comprises a first externally-facing surface on the coronal end of the implant body oriented substantially transverse to the longitudinal axis, and the abutment body comprises a ledge configured to mate with the first externally-facing surface.

25. The dental implant system of claim 20, wherein the transition zone defines a ledge, and the abutment is sized and shaped so that when the abutment is inserted into the implant internal bore, the apical end of the abutment body is spaced apart a distance coronally away from the ledge of the transition zone and the groove is positioned in the transition zone.

* * * * *